(12) United States Patent
Laing et al.

(10) Patent No.: US 7,565,859 B2
(45) Date of Patent: Jul. 28, 2009

(54) POWER CLAMP WITH KINETIC ENERGY CONTROL

(75) Inventors: John Gregory Laing, Macomb, MI (US); Erick William Rudaitis, Sterling Heights, MI (US); Walter O'Connor Morrison, Armada, MI (US)

(73) Assignee: SMC Corporation of America, Indianapolis, IN (US)

(\*) Notice: Subject to any disclaimer, the term of this patent is extended or adjusted under 35 U.S.C. 154(b) by 54 days.

(21) Appl. No.: 11/410,351

(22) Filed: Apr. 25, 2006

(65) Prior Publication Data
US 2007/0246877 A1  Oct. 25, 2007

(51) Int. Cl.
*F15B 15/22* (2006.01)
(52) U.S. Cl. ...................... 92/85 A; 92/85 R
(58) Field of Classification Search ............... 92/85 B, 92/85 R, 85 A
See application file for complete search history.

(56) References Cited

U.S. PATENT DOCUMENTS

| | | | | |
|---|---|---|---|---|
| 3,148,595 | A | * | 9/1964 | Looney .............. 92/11 |
| 4,043,254 | A | * | 8/1977 | Jaeger ............... 92/85 B |
| 6,186,484 | B1 | | 2/2001 | Noda et al. |
| 6,540,217 | B2 | | 4/2003 | Takahashi et al. |
| 6,641,123 | B2 | | 11/2003 | Takahashi |
| 6,648,317 | B2 | | 11/2003 | Takahashi et al. |
| 6,869,068 | B2 | | 3/2005 | Zhao et al. |

FOREIGN PATENT DOCUMENTS

| | | |
|---|---|---|
| DE | 4212078 A1 | 10/1993 |
| DE | 4238728 A1 | 5/1994 |
| DE | 19615583 A1 | 10/1997 |
| EP | 0918163 A1 | 5/1999 |
| EP | 0918163 B1 | 5/1999 |
| EP | 1178220 A2 | 2/2006 |
| EP | 1371857 A1 | 12/2006 |
| JP | 10252712 A | 9/1998 |
| JP | 11125211 A | 5/1999 |
| JP | 2001090713 A | 4/2001 |
| JP | 2004332747 A | 11/2004 |
| JP | 2005016721 A | 1/2005 |
| JP | 2005076713 A | 3/2005 |

OTHER PUBLICATIONS

SMC Information, Shock Absorber RB0694, "RB Series Shock Absorber with a M6 O.D. thread", http://www.smcwordl.com, © 2004, pp. 1-6.

\* cited by examiner

*Primary Examiner*—F. Daniel Lopez
(74) *Attorney, Agent, or Firm*—Bose McKinney & Evans LLP

(57) ABSTRACT

A clamp including kinetic energy control. The clamp includes a self-compensating, non-adjustable hydraulic damper having kinetic energy absorption, such as a shock absorber.

7 Claims, 5 Drawing Sheets

US 7,565,859 B2

POWER CLAMP WITH KINETIC ENERGY CONTROL

BACKGROUND OF THE INVENTION

Power clamps can be used to clamp components or workpieces which are to be secured together in the manufacture of products. For instance, power clamps are used to hold pieces together for a welding operation in the manufacture of automobiles.

Power clamps can be controlled by the application of a pressurized fluid, such as air, other gases, or a hydraulic fluid. The power clamp, also known as a clamp cylinder apparatus, can include a piston rod coupled to a piston which moves linearly in a reciprocal fashion within a housing. The movement of the piston in one direction causes an arm to rotate to a location to provide a clamping force. Movement of the piston in the opposite direction provides for removal of the arm from the article being clamped. The combination of the piston and the piston rod can have its linear motion stopped during unclamping at the end of its travel with a damper member. One example of such a clamp apparatus including a damper member is described in U.S. Patent Application Publication No. U.S. 2004/0041324 having a filing date of Aug. 19, 2003 the entirety of which is incorporated herein by reference.

Other known clamps include mechanisms for slowing down or stopping the piston. These mechanisms include those having a pneumatic cushion with built-in adjustable air cushion valves which can be adjusted based on the operating load and the operating speed. The air cushion operates only at the ends of the clamp cylinder stroke. Flow controls are also known which limit the speed of a clamp cylinder to acceptable limits to thereby reduce any impact loads which may occur on the clamp itself. Such a scheme, however, limits the clamp cylinder speed throughout the entire travel of the clamp cylinder.

The previously incorporated by reference U.S. Patent Application Publication No. 2004/0041324 describes an elastomeric bumper. The kinetic energy of the piston and piston rod combination is absorbed by the elastomeric bumper only at the very end of the clamp cylinder travel. The elastomeric bumper provides some shock absorption due to its material composition. There is, however, only slight movement of the bumper along the linear direction of the piston/piston rod due to compression of an elastomeric bumper.

Other known clamps include fixed orifices which have a built-in flow restriction to limit the clamp cylinder speed to an acceptable limit thereby reducing the impact loads on the clamp mechanism. As previously described for the flow controls, this scheme also limits the speed of the piston and piston rod throughout the entire travel of the clamp cylinder.

SUMMARY OF THE INVENTION

The present invention relates to a clamp apparatus which converts a linear motion of a cylinder into a rotary motion of a clamping means. In particular, the present invention relates to a clamp apparatus which includes a kinetic energy control device.

The present invention also relates to a clamp including a body, defining a cavity and a piston, disposed within the cavity and adapted to move within the cavity. A kinetic energy control device, having at least a portion thereof disposed within the cavity, can be positioned to contact the piston during movement of the piston. The kinetic energy control device can be adapted to slow movement of the first piston when contacted by the piston. The piston can be stopped by a stopper, bolt, a device housing, or by a portion of the clamp, such as an end plate.

According to another aspect of the present invention there is provided a clamp including a body, defining a cavity and an aperture. The clamp includes a piston, disposed within the cavity and adapted to move reciprocally therein. The clamp also includes a shock absorber, having a first portion thereof disposed within the cavity and a second portion thereof disposed within the aperture. The shock absorber includes a piston rod adapted to move reciprocally within the cavity and to slow movement of the clamp cylinder piston when contacted by the shock absorber piston rod.

In another aspect of the present invention there is provided a method of reducing a working cycle time of a fluid controlled clamping apparatus to achieve a preferred cycle time. The clamping apparatus includes a clamp, a fluid supply coupled to the clamp, and a flow restrictor disposed between the clamp and the fluid supply. The method includes the steps of coupling a shock absorber to the clamp, and modifying the flow restrictor to adjust the flow of fluid to the clamp to thereby reduce the cycle time to achieve the preferred cycle time.

DETAILED DESCRIPTION OF THE DRAWINGS

Figure 1:
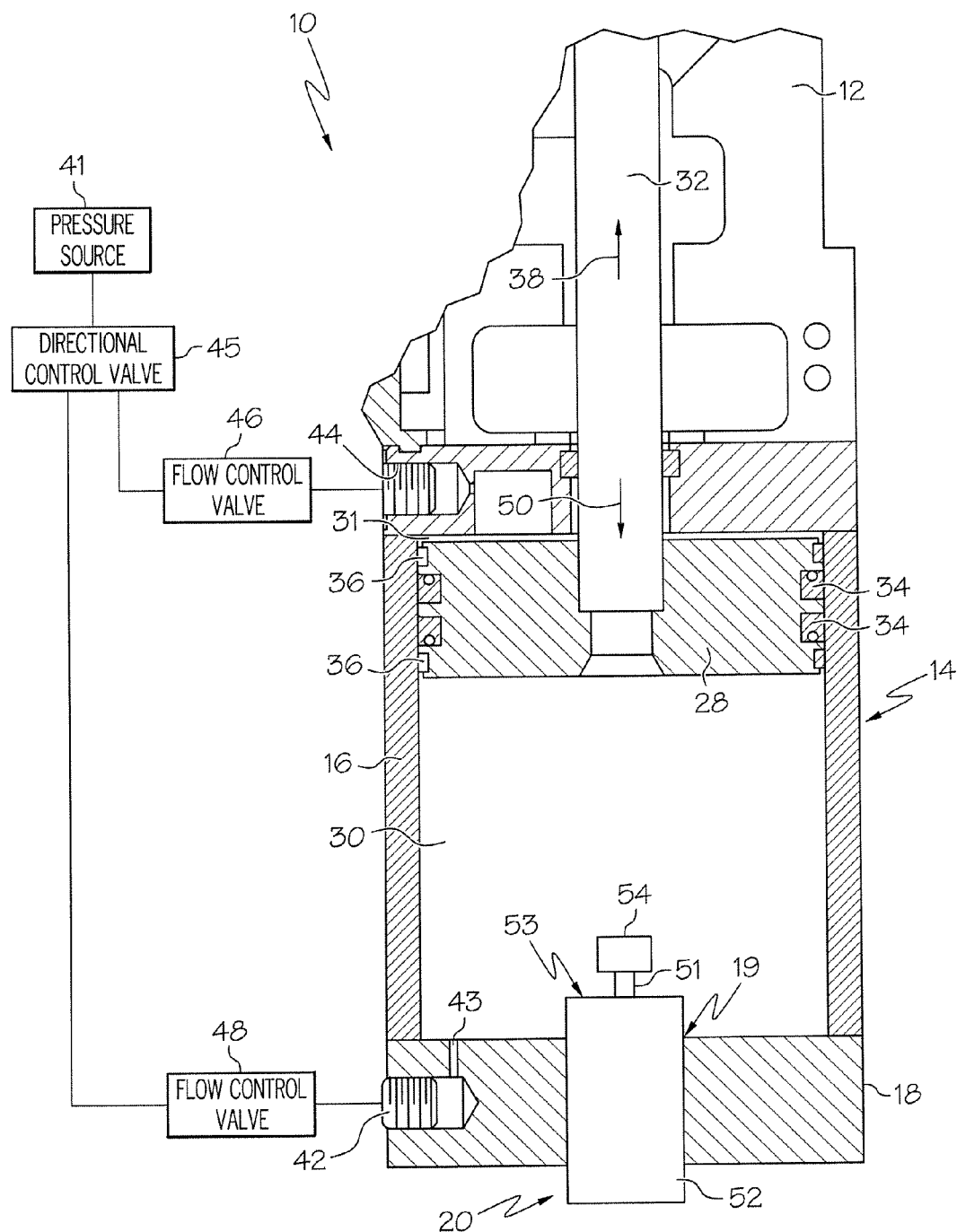
FIG. 1 is a partial cutaway elevational view of a clamp apparatus including kinetic energy control of the present invention.

FIG. 1 illustrates a partial cutaway elevational view of the clamp apparatus 10 of the present invention including a kinetic energy control device. The clamp apparatus 10 includes a body 12 which provides a housing for the various components either disposed within or attached to the clamp apparatus 10. The body 12 includes a cylinder section 14 including a cylinder tube 16 coupled to an end block or rear plate 18. The cylinder tube 16 can be coupled to the end block 18 with couplers or according to other known methods understood by those skilled in the art. Within a cavity 19 formed in the end block or plate 18, a kinetic energy control device 20 is disposed. The kinetic energy control device 20 absorbs and releases the kinetic energy of a piston 28 which impacts the control device 20.

A piston rod 32, coupled to the piston 28, moves responsively to the action of the piston 28 moving through the cylinder chamber 30. The piston 28 drives the piston rod 32 reciprocally in a linear direction. The piston 28 includes one or more piston packings 34 and one or more wiper rings 36. The piston packings 34 provide for an air tight seal between the piston 28 and the inner surface of the cylinder tube 16. Rings 36 provide for wiping of the inner surface of the cylinder chamber. This air tight seal enables the piston to respond to the application of a pressurized fluid, such that the clamp can provide a clamping force with an arm (not shown) which is driven by the movement of the piston rod 32. The piston rod 32 is driven in a first direction 38 under the application of pressurized air applied to a first fluid inlet/outlet 42. A source of pressurized air 41 is coupled to the fluid inlet/outlet 42 through a directional control valve 45, through a flow control valve 48 and passes through the inlet/outlet 42 into and through channel 43 into chamber 30. The pressurized air provides a driving force to move the piston 28 and the piston rod 32 in the direction 38. As the piston 28 moves in the direction 38, the air compressed within the chamber 31 passes through first fluid inlet/outlet 44.

The clamping apparatus of FIG. 1 includes a clamping arm (not shown) which clamps at least two pieces which are subsequently bonded or secured by welding or some other means. The linear motion of the piston 28 in the direction 38 controls the clamping of the arm such that movement of the rod in a direction 38 moves the arm into a clamping position. At an end of the rod 32 opposite the piston 28, a toggle linkage mechanism (not shown) is used to convert the linear motion of the rod 32 into a rotational motion such that the clamp arm can move from an open position to a closed position and vise versa.

The air which escapes from the fluid inlet/outlet 44 can be controlled by a control device such as by coupling the inlet/outlet 44 to a first flow control valve 46. The valve 46, also known as a speed controller, includes a controllable orifice which allows for increasing or decreasing the amount of air passing through the inlet/outlet 44 such that the motion or speed of the piston rod 32 in the direction 38 can be controlled. It is also possible to control the amount of air pressure supplied at inlet/outlet 42 to control speed of the air flow to the clamp.

Once the clamping operation is completed, for instance when the welding process has coupled the two pieces together, the clamp is opened such that the work piece can be either removed or positioned at a new location for another clamping procedure. To open the clamp, the air pressure source 41 is coupled to the inlet/outlet 44, through the directional control valve 45, and through the valve 46 to thereby move the piston 28 in a direction 50 to thereby open the clamp.

During opening of the clamp, the piston 28 moves in the direction 50. Air in the chamber 30 is forced through the inlet/outlet 42 and through a valve 48 coupled thereto. As with the valve 46, the air being expelled from the inlet/outlet 42 can be controlled by adjusting the orifice size of the valve 48. Software controllers can also be used to control the valves 46 and 48 as would be understood by one skilled in the art.

It has been found that in manufacturing operations that increasing the process speed can increase the throughput of a manufactured assembly potentially reducing the overall cost of the manufactured product. One way to increase the speed of the process, using a clamp of the prior art, is to run the clamp at a higher speed such that the open and close times can be shortened. It has been found, however, that reducing the open and close times of the clamp of the prior art can only be reduced to a certain amount before the clamp begins to operate under conditions which are not conducive to operating the clamp over long periods of time. For instance, running clamps at reduced cycle times can create "banging" of the device upon opening, thereby indicating that the device can be experiencing an appreciable stress. While it has been found that the clamp could close in an acceptable fashion due to the design of the linkage mechanism, opening of the clamp at the reduced cycle time produced undesirable stresses.

Referring again to FIG. 1, the clamping apparatus 10 includes the kinetic energy control device 20 which allows for the control of the kinetic energy of the piston 28 and piston rod 32 assembly. The control device 20 includes a built-in, self compensating, non-adjustable hydraulic damper as opposed to adjustable pneumatic cushioning schemes, internal fixed orifices, or adjustable air cushion valves. The kinetic energy control device 20 includes a piston rod 51 which moves linearly within a device body 52. Coupled to the piston rod 51 is a cap 54. The cap 54 provides a first point of impact between the device 20 and the piston 28. The cap 54 can be formed of an elastomeric material. It has been found that the use of a kinetic energy control device 20 within the clamp apparatus 10 enables the clamp apparatus to operate a higher speed and with greater loads on the clamp arm without excessive impact/loading of the internal mechanisms, such as the linkage mechanism, used to drive the clamp arm. It is within the scope of the present invention to have a control device with a piston rod 51, but not the cap 54.

The kinetic energy control device 20 allows for kinetic energy control upon the clamp opening sequence. When the clamp opens due to pressurized air being applied to inlet/outlet 44, the piston moves in the direction 50. The piston 28 includes a predetermined amount of kinetic energy based on its mass and speed of motion. Once the piston 28 contacts the cap 54, the kinetic energy of the piston is absorbed and/or displaced by the control device 20. In the illustrated embodiment, the piston 28 stops upon contact with a surface 53 of control device 20. The piston 28 remains in contact with the surface 53 until the clamp is closed again. Other mechanisms of stopping the piston are described later herein. Built in deceleration of the clamp arm and the load during clamp closing is automatically provided.

It is within the scope of the present invention to operate the clamp apparatus 10 at any normal line pressure without the use of flow controls, for instance valves 46 and 48. Reduced cycle times are thereby achieved while keeping impact loads and therefore stresses on the internal clamp mechanism to a desired level.

The present invention includes replacement of a stopper bolt 55 (See FIG. 2) with the self-compensating, non-adjustable, hydraulic damper 20. The stopper bolt 55 includes a seated elastomeric plug 56. The stopper bolt 55, which can be used to control the arm opening angle of a pneumatic power clamp as described in the previously incorporated by reference U.S. Patent Application Publication No. 2004/0041324, can be removed and replaced with the device 20.

Figure 3:
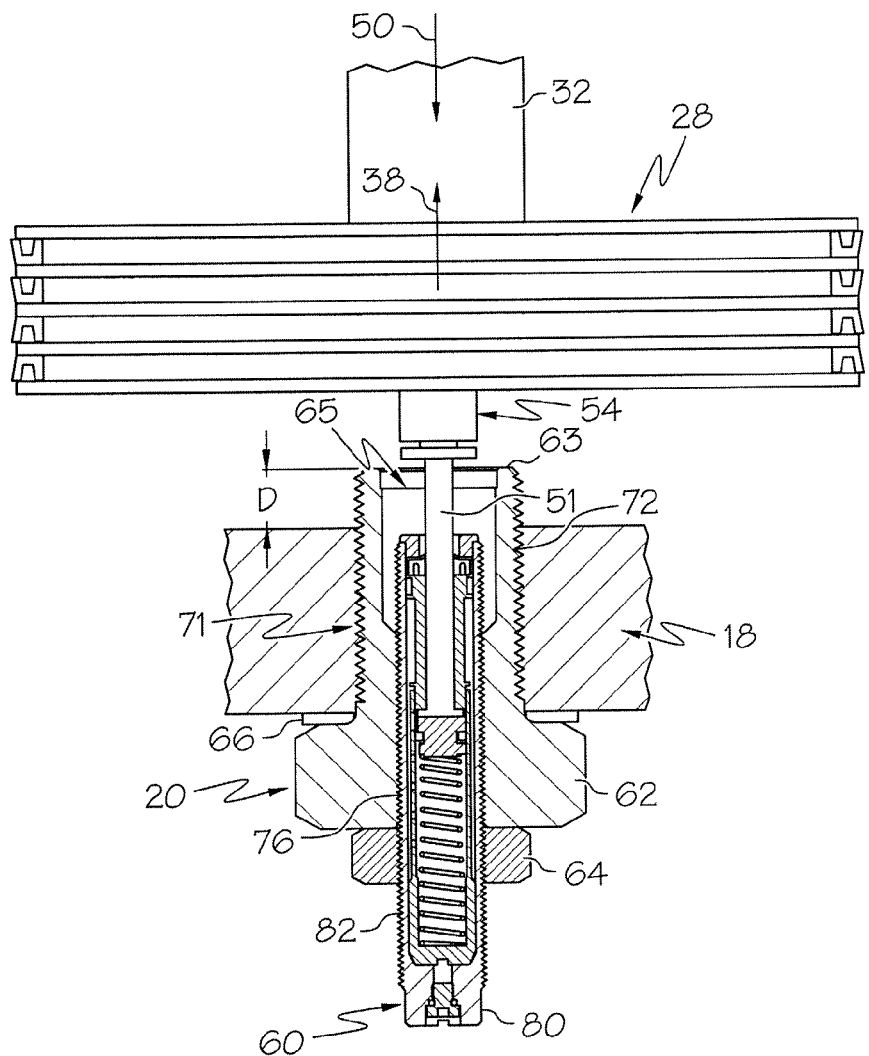
FIG. 3 is a partial cutaway schematic view of a kinetic energy control device of the present invention contacting a piston coupled to a piston rod.

One embodiment of the present invention including the kinetic energy control device 20 is further illustrated in FIG. 3. Movement of the piston rod 32 in the direction 50 moves the piston 28 into contact with the cap 54 which is coupled to the piston rod 51 of the device 20. The kinetic energy control device 20 includes a shock absorber 60 mounted within a bolt 62 and held in a predetermined position with respect to the plate 18 by a stop or nut 64. The bolt includes a channel 65 formed therein to accept the absorber 60.

The shock absorber 60 is positioned within the bolt 62 such that the cap 54, when contacted by the piston 28, can move to a recessed location within the bolt 62 such that the top of the cap 54 is located below a top portion 63 of the bolt. The portion 63 of the bolt 62 stops movement of the piston 28. Other mechanisms for holding the absorber to the clamp are within the scope of the present invention. For instance, a cylinder having internal and external threads can be used.

A distance D, the distance between the top portion 63 and a top surface of the plate 18, can be adjusted to different distances. The distance D is selected to control the arm opening angle of the clamp arm.

A seal or O-ring 66 provides a seal between the plate 18 and the bolt 62. In one embodiment of the present invention, the use of a clamp apparatus such as described in U.S. Patent Application Publication No. US2004/0041324, and partially illustrated in FIG. 2, does not require any modification, since the kinetic energy control device of FIG. 3 can fit within a preformed cavity 68 of FIG. 2.

Figure 4:
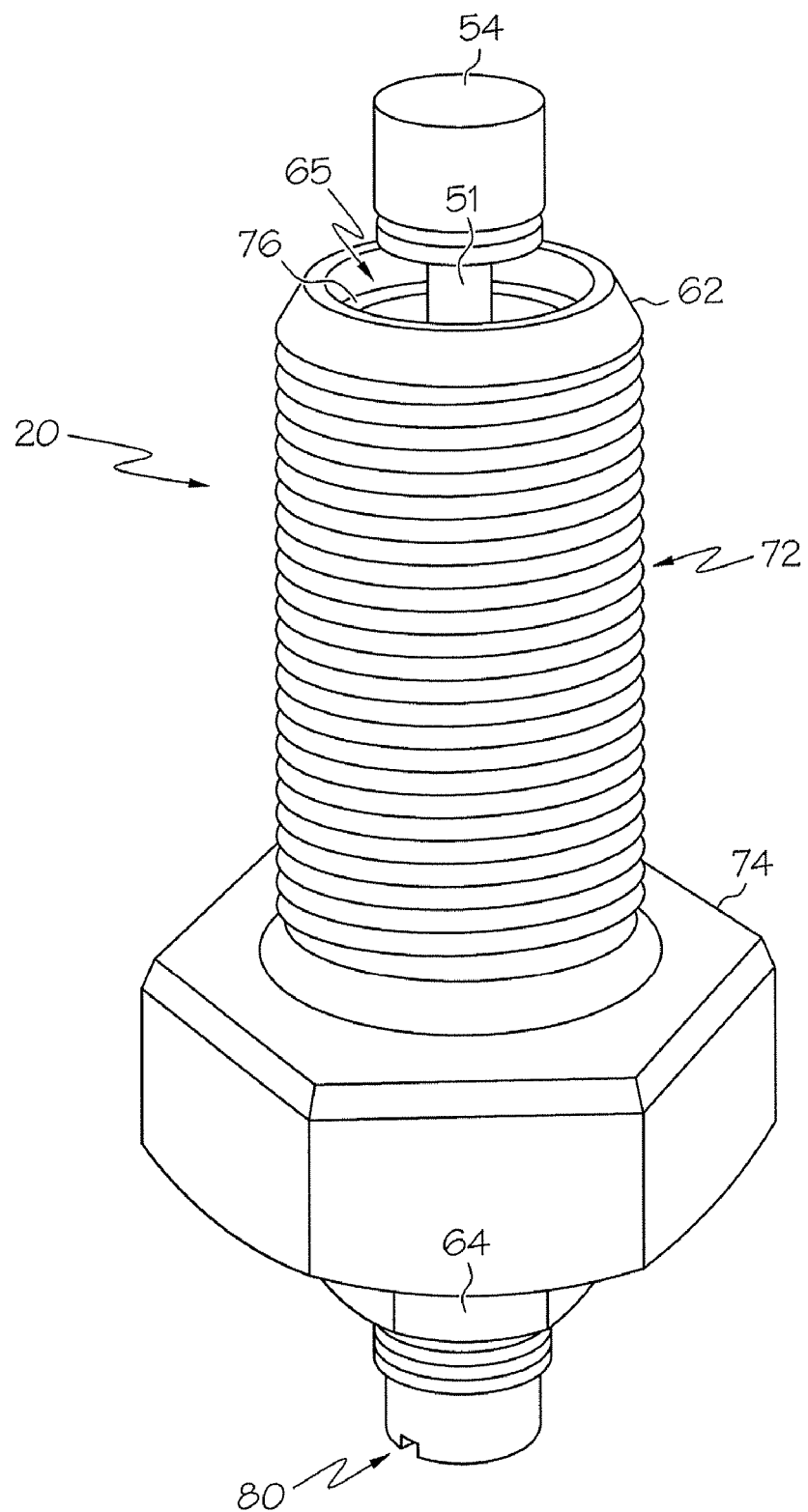
FIG. 4 illustrates a perspective view of a kinetic energy control device used with a clamp apparatus of the present invention.

FIG. 4 illustrates a perspective view of one embodiment of the kinetic energy control device 20. Bolt 62 includes a threaded portion 72 extending from a flange 74. The threaded portion 72 fits within a cavity 71 of the plate 18 and is threaded therein to a desired position to achieve the desired kinetic energy control as well as to control the opening angle of the arm (See FIG. 3). The bolt 62 is threaded into the aperture 71 to a position such that the seal 66 is compressed. Typically, the bolt 62 can be formed to have an internally threaded portion 76. The threaded interior portion 76 of the bolt 62 receives a shock absorber 80 to be described in greater detail with respect to FIG. 5. The shock absorber 80 includes exterior threads 82 which meet or cooperate with the internal threads 76 of the bolt such that the position of the shock absorber 80 within the bolt 62 can be appropriately selected. The nut 64, which includes internal threads cooperating with the external threads 82 of the shock absorber 80, is used to locate the shock absorber at a predetermined position within the bolt 62. This position can be selected to provide an appropriate amount of kinetic energy control. It is also within the scope of the present invention to have the threads of the shock absorber 80 to meet with the threads of the cavity 71. In this case, the bolt 62 may be unnecessary.

Figure 5:
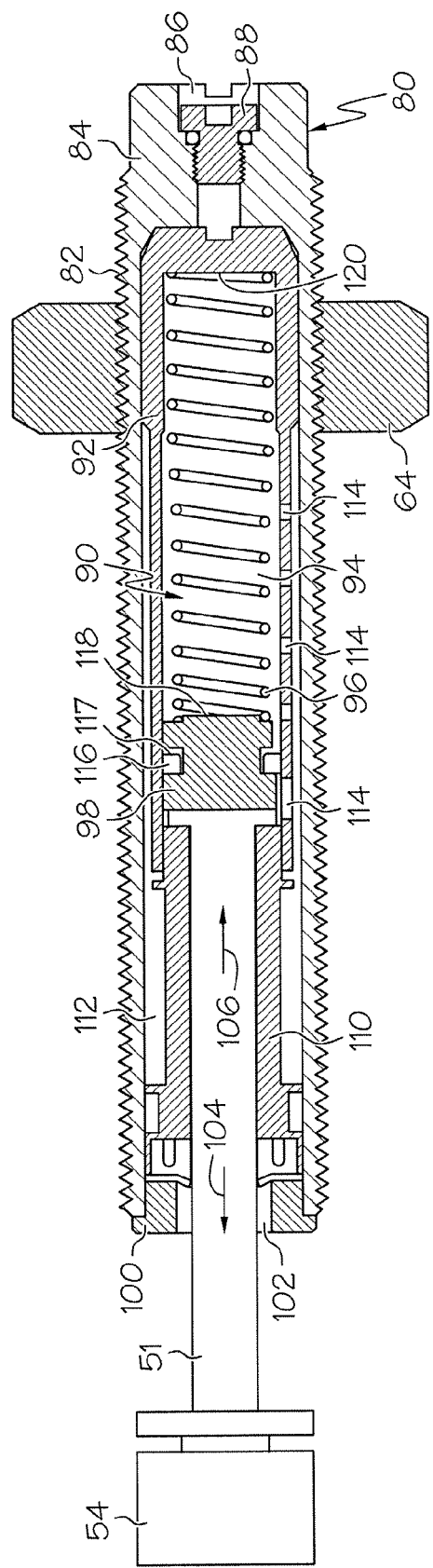
FIG. 5 illustrates a kinetic energy control device including a shock absorber and a stop.

FIG. 5 illustrates the shock absorber 80 previously described with respect to FIGS. 3 and 4. The shock absorber 80 includes a cylinder 84 upon which the external threads 82 have been formed. At one end of the cylinder 84 is an orifice 86 into which a plug 88 is inserted as would be understood by those skilled in the art. The cylinder 84 also defines a cavity 90 into which a shock tube 92 is inserted. The shock tube 92 also includes a cavity 94 into which a coil spring 96 is disposed. The piston rod 51 is inserted into the cavity 90 and then into the cavity 94 of the shock tube 92. A piston head 98, which is coupled to the piston rod 51, contacts one end of the spring 96. As illustrated, the spring 96 is in an uncompressed state and provides for positioning of the piston rod 51 within the tube. A cap 100 disposed within an open end of the cylinder 84 includes an orifice 102 having a diameter slightly larger than the diameter of the piston rod 51. The orifice 102 enables movement of the piston rod 51 in a direction 104 and a direction 106 substantially perpendicular to the plate 18. A bearing 110 circumferentially encloses the piston rod 51 and also provides for the linear motion of the piston rod 51 in the directions 104 and 106. Adjacent the bearing 110 is a foam accumulator 112.

The shock absorber 80 includes a double cylinder arrangement, the cylinder 84 and the shock tube 92, with the foam accumulator 112 located in a space between the shock tube 92 and the cylinder 84. A plurality of holes or orifices 114 are formed in the side wall of the shock tube 92 along a portion of the length of the shock tube 92. An oil is placed within the cavity 94. During movement of the piston rod 51, a check ring 116, located within a channel 117 of the piston head 98, is seated. The oil within the chamber 94 is forced through the orifices of the shock tube wall. The oil passes into the closed cellular foam accumulator 112 where the oil accumulates between a surface 118 and a surface 120 of the shock tube 92. The piston head 98 passes the orifice 114 during movement of the piston rod 51 in the direction 106 thereby reducing the exposed orifice area enclosing the orifice holes. Once the piston rod 51 has moved in the direction 106, substantially controlled by the impact of the piston 28 with the cap 54, the spring 96 which had been compressed upon impact, until bolt 62 stops piston 28 (See FIG. 3). The spring then begins to uncompress thereby pushing the piston rod 51 in the direction 104. This unseats the check ring 116 and permits the oil to flow from the accumulator and across the piston head back into the shock tube 92.

The kinetic energy control device 20 of the present invention, and more particularly the shock absorber 80 can include a self-compensating, non-adjustable hydraulic damper such as an Enidine SPM IF-3B Shock Absorber available from Enidine Incorporated of Orchard Park, N.Y. Another shock absorber for use in the present invention includes an RB0604 Shock Absorber available from SMC Corporation, Tokyo, Japan.

Figure 2:
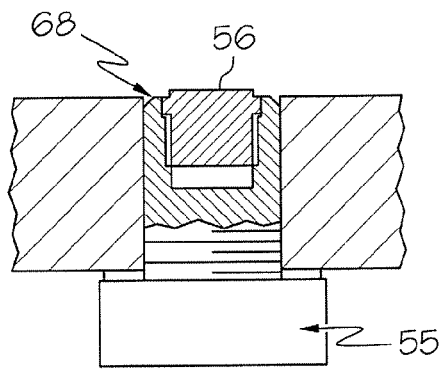
FIG. 2 is a partial cutaway view of an elastomeric bumper used with a clamp apparatus of the prior art.

For the present invention, it has been found that the stopper bolt of FIG. 2 could be removed and the aperture 68 need not be resized. In the described embodiment, the clamp includes a bore size of 63 mm. The selected Enidine device provides an effective cushion length of 21.3 millimeters and provides an allowable kinetic energy absorption of 11 joules. In addition, the load weight of the absorber was between 300 and 500 kg.

Figure 6:
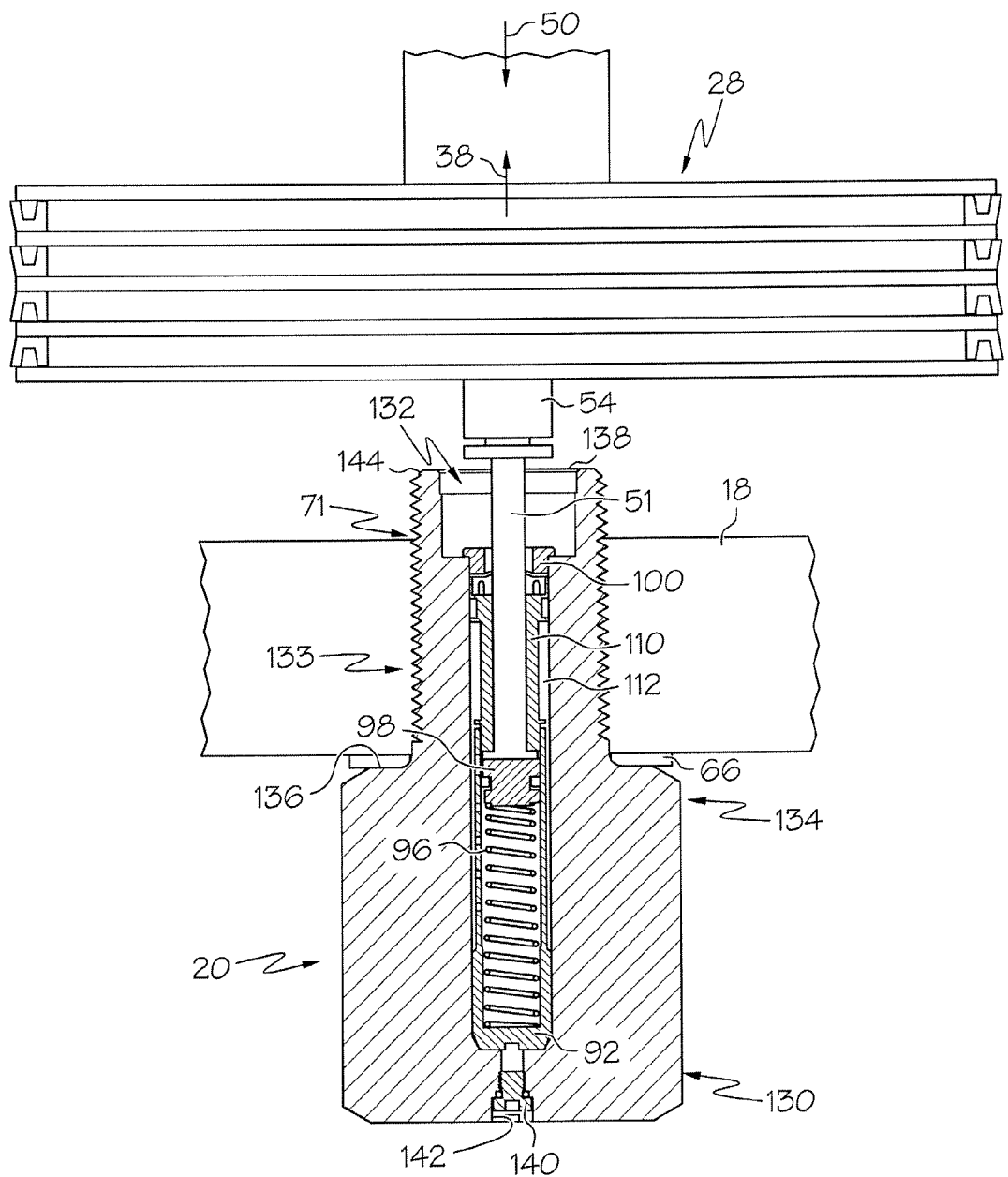
FIG. 6 illustrates another embodiment of a kinetic energy control device.

Another embodiment of the kinetic energy control device 20 is illustrated in FIG. 6. The kinetic energy control device 20 includes a housing 130 which includes a chamber or channel 132 formed therein. The channel runs through the center of the housing 130 which is substantially cylindrical in shape having a first portion 133 and a second portion 134 with a diameter larger than a diameter of the first portion 133. The first portion 133 fits within the cavity 71 of the plate 18. The second portion 134 includes a shoulder 136 which contacts the gasket 66. The housing 130 can be made of steel, aluminum, or other materials including metals sufficiently durable to withstand continued operation of the clamp.

The channel 132 includes a first end 138 into which selected parts of previously described shock absorber of FIG. 5 can be inserted. The selected parts can include the piston rod 51, the shock tube 92, the spring 96, the piston head 98, the cap 100, the bearing 110, and the accumulator 112. The shock tube 92 can be press fit into the housing 130 with the remaining parts inserted therein. Other mechanisms of retaining the shock tube within the channel are also within the scope of the present invention. A plug 140 is inserted into a second end 142 of channel 138. To adjust the opening angle of the clamp arm, different widths of gaskets 66 can be used to set the distance between the plate 18 and a top surface 144 of the housing 130. It is also possible to control opening angle by providing housings 130 having different lengths. The embodiment of FIG. 6 provides a kinetic energy control device which can be incorporated in new clamps as well as pre-existing clamps.

While one embodiment of the present invention provides for the replacement of the stopper bolt with a shock absorber, the present invention is not limited to replacement of a stopper bolt with a shock absorber. The present invention includes a power clamp and a self-compensating, non-adjustable hydraulic damper having kinetic energy absorption selected to accommodate a kinetic energy of a clamp operating at an operating pressure. It is also within the scope of the present invention to have a clamp in which the kinetic energy control device is coupled to the piston. In addition, it is not a requirement that stress on a clamp be reduced according to the present invention, since the present invention can be used to provide for reduced cycle times.

While this invention has been described with specific embodiments thereof, alternatives, modifications and variations may be apparent to those skilled in the art. For instance, it is within the scope of the present invention to include kinetic energy control at the clamp opening and/or clamp closing sequence. Accordingly, it is intended to embrace all such alternatives, modifications and variations that fall within the spirit and broad scope of the appended claims.

The invention claimed is:

1. A clamp comprising:
   a body, defining a cavity and an aperture;
   a piston, disposed within the cavity and adapted to move reciprocally therein,
   a shock absorber, having a first portion thereof disposed within the cavity and a second portion thereof disposed within the aperture, the shock absorber including a piston rod adapted to move reciprocally within the cavity and to slow movement of the piston when contacted by the piston, wherein the second portion of the shock absorber includes a cylinder having a first mating surface and the aperture includes a second mating surface wherein the first mating surface and second mating surface provide variable positioning of the shock absorber with respect to the body, and
   an adaptor, disposed between the first mating surface and the second mating surface, the adaptor defining a third mating surface to interface with the first mating surface of the cylinder and a fourth mating surface to interface with the second mating surface of the aperture.

2. The clamp of claim 1, wherein the adaptor comprises a bolt including a bolt aperture, wherein the bolt aperture defines the third mating surface.

3. The clamp of claim 2, wherein the first, second, third, and fourth mating surfaces comprise threads.

4. The clamp of claim 1, wherein the first mating surface and the second mating surface comprise threads.

5. The clamp of claim 1, wherein the shock absorber is coupled to the body.

6. The clamp of claim 1, wherein the shock absorber comprises a spring, the spring being adapted to slow movement of the piston rod when contacted by the piston.

7. The clamp of claim 1, wherein the shock absorber comprises a cap coupled to the piston rod, the cap being adapted to contact the piston during motion of the piston.

* * * * *